R. R. Q. CASEY, O. G. MUHLIG & E. SEEBERS.
WORK HOLDER FOR SAWING MACHINES.
APPLICATION FILED OCT. 30, 1915.

1,248,805.

Patented Dec. 4, 1917.
2 SHEETS—SHEET 1.

WITNESSES:
A. B. Cornelius
E. Peterson

INVENTORS
Ralph R. Q. Casey
Otto G. Muhlig
Edward Seebers
BY
Pierre Barnes
ATTORNEY R. R. Q. CASEY, O. G. MUHLIG & E. SEEBERS.
WORK HOLDER FOR SAWING MACHINES.
APPLICATION FILED OCT. 30, 1915.
1,248,805.
Patented Dec. 4, 1917.
2 SHEETS—SHEET 2.
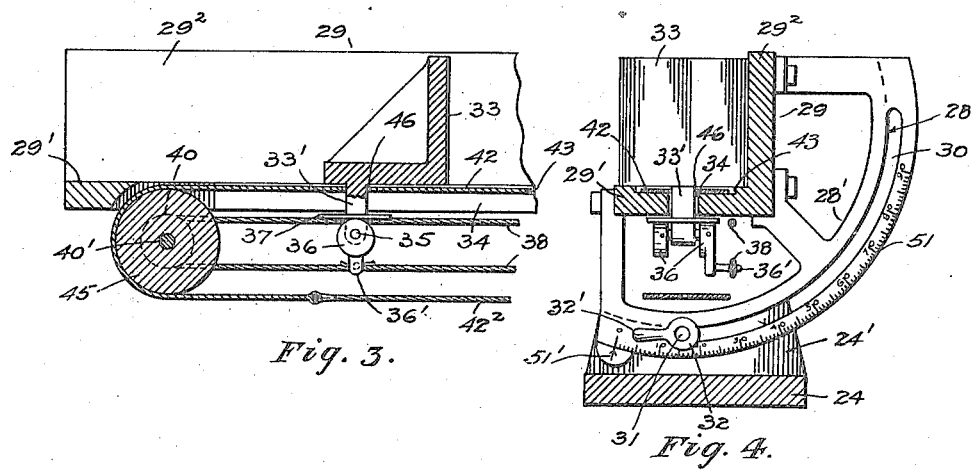
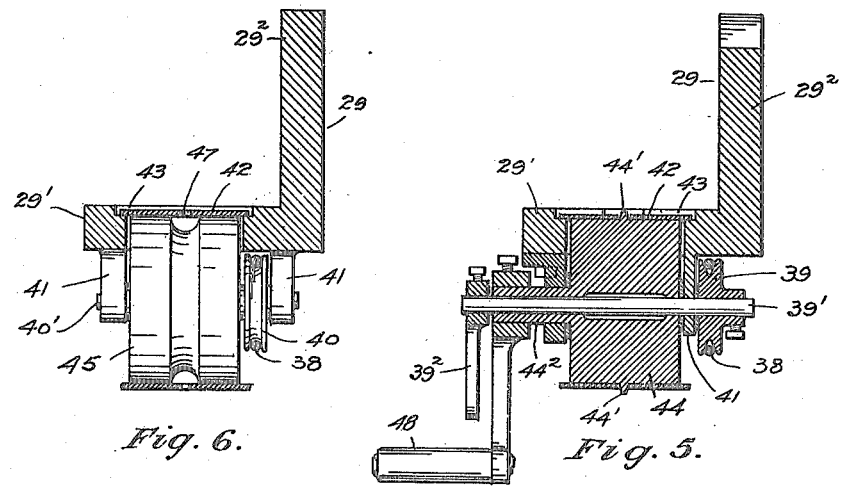
WITNESSES:
A. B. Cornelius
E. Peterson
INVENTORS:
Ralph R. Q. Casey
Otto G. Muhlig
Edward Seebers
BY
Pierre Barnes
ATTORNEY

UNITED STATES PATENT OFFICE.

RALPH R. Q. CASEY, OF SEATTLE, WASHINGTON, AND OTTO G. MUHLIG AND EDWARD SEEBERS, OF PORTLAND, OREGON.

WORK-HOLDER FOR SAWING-MACHINES.

1,248,805.      Specification of Letters Patent.      Patented Dec. 4, 1917.

Application filed October 30, 1915. Serial No. 58,778.

*To all whom it may concern:*

Be it known that we, RALPH R. Q. CASEY, a citizen of the United States, residing at Seattle, in the county of King and State of Washington, and OTTO G. MUHLIG and EDWARD SEEBERS, citizens of the United States, residing at Portland, in the county of Multnomah and State of Oregon, have invented certain new and useful Improvemets in Work-Holders for Sawing-Machines, of which the following is a specification.

This invention relates to sawing machines and, more especially, to adjustable holders for the work, whereby the sawyer is enabled to regulate the holder to cut material to predetermined lengths and selected bevels.

The main object of our invention is the perfecting of devices of this character by the provision of an inexpensively constructed and efficient work-holder which is adjustable to various angles.

Another object is to provide conveniently operable means to regulate predeterminately the lengths to which material is to be cut.

The invention consists in the novel construction, adaptation and combination of parts, as will be hereinafter described and claimed.

Figure 1:
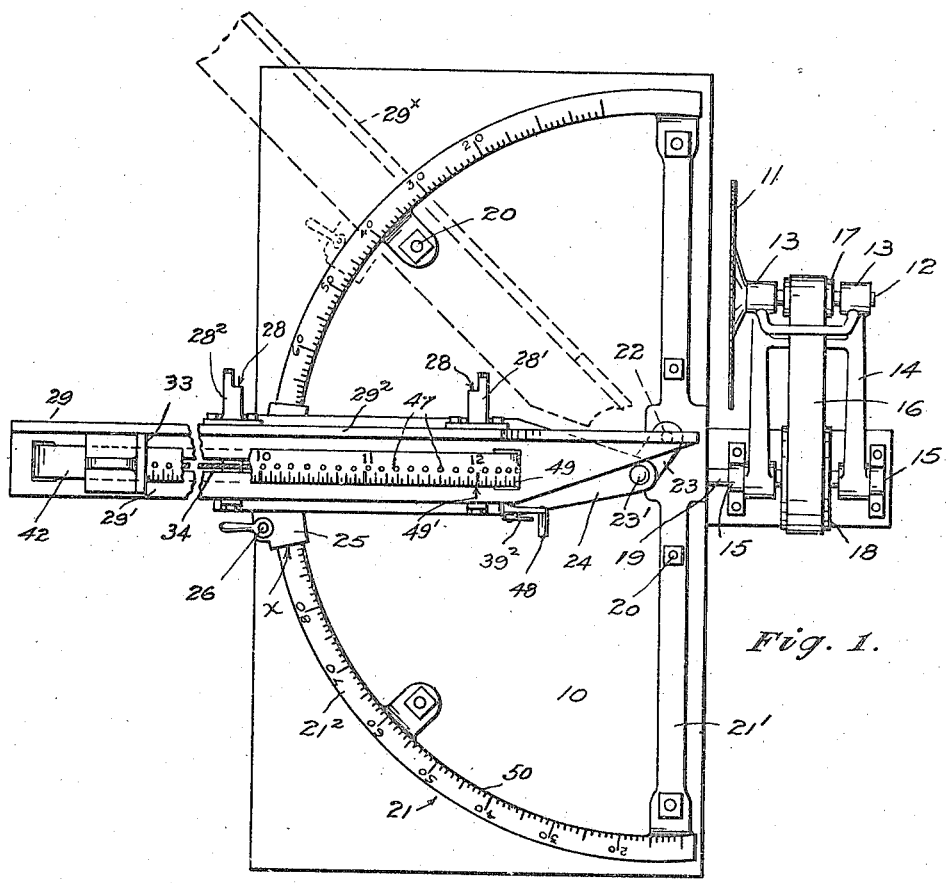
Figure 2:
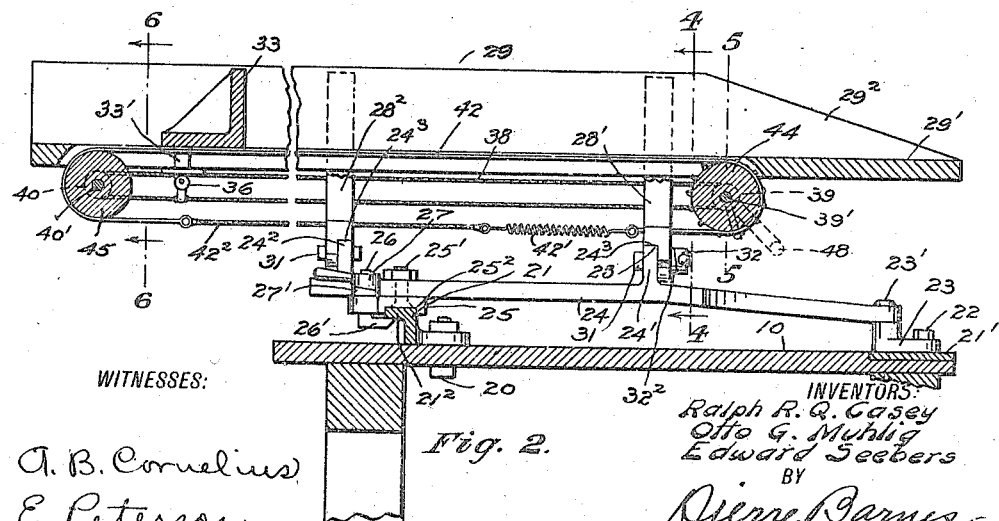

In the accompanying drawings, Figure 1 is a plan view of devices embodying the present invention applied to a work-table of a swing-saw. Fig. 2 is a view partly in front elevation and partly in longitudinal vertical section of the same. Fig. 3 is a longitudinal vertical section of the outer end of the work-holder to a larger scale than shown in Fig. 2. Figs. 4, 5 and 6 are transverse vertical sections taken, respectively, through 4—4, 5—5 and 6—6 of Fig. 2.

Referring to the drawings, 10 represents the top of a saw table of suitable construction. To one side of said table is a circular saw 11 mounted on an arbor 12 which is journaled in boxes 13 of a frame 14. This frame, as illustrated, is of a well-known type of swing-saw frames and is journaled to boxes 15 so that the saw which is carried at the free end of the frame may be swung with the latter to cut the work. The saw-arbor is driven by a belt 16 passing about the arbor pulley 17 from a pulley 18 upon a power-driven shaft 19.

Fixedly secured to the table top 10, as by bolts 20, is a frame comprising an arc member 21 and a chord member $21^1$. Said arc member, as shown in Fig. 2, is formed of an angular shape in cross-section to provide a flange $21^2$ at the top.

Intermediate the length of the chord member $21^1$ is pivotally connected by a pin 22 thereto, the end of a link 23 whose other end is connected by a pin $23^1$ with an end of an arm 24 which extends over the frame member 21.

25 represents a guide block interposed between the arm 24 and the frame flange $21^2$. Said block is swiveled to the arm by a pivotal pin $25^1$ and is provided with a recess $25^2$ in the underside to fit the flange $21^2$. The arm 24 is secured in adjusted angular positions to the frame member 21 by a locking bolt 26 carried by the block and having a hooked end $26^1$ to engage against the underside of the flange $21^2$ through the medium of a cam 27 rotatable on the locking bolt coacting with a cam washer $27^1$ provided on the block.

Extending upwardly from the arm 24 are transversely arranged spaced plate elements $24^1$ and $24^2$ terminating in arcuate upper edges $24^3$ upon which are seated correspondingly shaped surfaces 28 of rockers $28^1$ and $28^2$ which depend from the trough-shaped body 29 of a cradle which constitutes the work-holder of the machine. Each of said rockers is provided with a slot, as 30, Fig. 4, through which passes a bolt 31 secured to the respective elements of the arm 24.

Provided for the bolt 31 of the rocker $28^1$ is a cam element 32 which is actuated by a handle $32^1$ to coact with a cam washer $32^2$ to clamp the rocker $28^1$ to the element $24^1$ for securing the work-holder in a selected rotary position.

The cradle-body or trough 29 of said holder is comprised of a floor member 29¹ and a wall member 29² arranged in rectangular relations.

33 represents a gage block or stop seated upon the trough floor 29¹ and having a depending lug 33¹ extending through a slot 34 provided in said floor. Pivotally connected by a pin 35 to the lug 33¹ is a pair of eccentrics 36 employed to clamp the stop in adjusted positions to the trough by forcing a bearing plate 37 against the underside of the trough floor in opposition to the downward pressure acting through the stop against the top of such floor.

To operate the eccentric, we preferably utilize an endless cable 38 having one of its leads secured to an arm 36¹ of an eccentric and passing about grooved sheaves 39 and 40 respectively disposed adjacent to the trough ends. These sheaves are mounted on shafts 39¹ and 40¹ journaled in bearing boxes 41 provided on the under side of the trough. The shaft 39¹ is provided with a crank arm 39² whereby the sheave 39 may be sufficiently rotated to impart movement to the cable 38 to cause the eccentrics 36 to be engaged or disengaged with respect to the trough.

Included in the invention are appliances controlled by means within reach of the sawyer whereby the stop 33 may be moved to predetermined distances from the saw. Such appliances comprise a strip 42 of thin steel or other flexible material having a relatively small coefficient of expansion, which is seated in a longitudinal groove or guide-way 43 in the top of the trough floor 29¹ and thence passes about wheels 44 and 45 which are mounted, respectively, on the shafts 39¹ and 40¹. The ends of said strip are connected by a spring 42¹ and a wire or cable 42² which constitute, in effect, with the strip 42, an endless belt. The stop 33 is coupled with the strip 42 by having the lug 33¹ of the former engage in an aperture 46 of the strip. Said strip is also provided with a series of holes 47 to be engaged successively with peripheral sprocket teeth 44¹ provided on the wheel 44 whereby motion is given to the stop to advance or recede the same by rotating such sprocket wheel in one direction or the other.

To such ends, is provided a crank 48 fixed to the hub 44² of the sprocket wheel, as clearly shown in Fig. 5.

The strip 42 is marked with a scale 49 to indicate with reference to an index mark 49¹ provided on the trough floor 29¹ the distance of the stop 33 from the plane at which the saw will cut a stick whose outer end is juxtaposed with the stop. A protractor scale 50 is provided on the arc member 21 to denote the angular position of the work holder with respect to the saw and in reference to the edge $x$, for example, of the block 25. A protractor scale 51 is also provided on the rocker 28¹ of the work holder to denote with reference to an indicating mark 51¹ on the arm 24¹ the extent to which the trough is turned about its longitudinal axis as, for instance, when a skew cut is to be made to a piece of material placed within the trough.

The angular position of the work-holder is regulated by first loosening the bolt 26 from its engagement with the arc member 21 and then swinging the arm about the axis of said arc member until the desired angular position of the holder is attained, as for instance, into the dotted line position 29ˣ, whereupon the bolt 26 is influenced to lock the arm 24 in its selected position through the medium of the cams 27—27¹.

By reason of the block 25 being guided by the arc member 21, the link 23 will swing to accommodate the relatively smaller arc of travel of the end of the arm 24 which is adjacent to the saw. The work holder is turned about its longitudinal axis after disengaging the clamping bolt 31 in the rocker 28¹ and reëngaging the same subsequent to the holder being turned into a desired position, as denoted by the protractor scale 51.

All of the controlling devices for the work-holder and for the stop 33 are arranged to be operated from the sawyer's position in front of the saw table.

What we claim, is—

1. In a machine of the class described, the combination with a saw, of a work-holder, a support therefor, a frame connected to said support for guiding horizontally the work-holder into various angular positions with respect to said saw, and a cam operated clamping member engaging said frame for securing the support in adjusted positions relative to said frame.

2. In a machine of the class described, the combination with a saw, of a work-holder having a trough-shaped body, a support therefor, connections between the support and said holder whereby the latter may be adjustably moved about an axis longitudinal of the holder, means for carrying and guiding said support whereby the work-holder is movable to selected angular relations to the plane of said saw and cam operated clamping members for holding the work-holder in adjusted positions.

3. In a machine of the class described, the combination with a saw and a stationary frame having an arc member and a chord member, of an arm guided from one of its ends by said arc member, a link connecting the other end of said arm to said chord member, means carried by said arm and clamped about said arc member to secure said arm in predetermined angular relations with respect to said saw, a work-holder supported by said arm and connected thereto for rotary movements about an axis longitudinal of the work-holder, and means for securing said work-holder in rotary adjustments.

4. In a machine of the class described, the combination with a saw, of a work-holder, a gage movable lengthwise of the work-holder, means to effect the movements of said gage, and an endless metallic band having an opening therein for the reception of a dependent portion of said gage for securing the latter in adjusted positions to the work-holder.

RALPH R. Q. CASEY.
                OTTO G. MUHLIG.
                EDW. SEEBERS.

Witnesses for R. R. Q. Casey:
    E. PETERSON,
    PIERRE BARNES.

Witnesses for Otto G. Muhlig:
    A. E. GEBHARDT,
    ADOLPH RIETZ.

Witnesses for Edward Seebers:
    JED BALLANTYNE,
    EDWARD L. TITLEY.

Copies of this patent may be obtained for five cents each, by addressing the "Commissioner of Patents, Washington, D. C."